US012699969B2

(12) United States Patent
Palamadai et al.

(10) Patent No.: US 12,699,969 B2
(45) Date of Patent: Aug. 4, 2026

(54) METHODS, SYSTEMS, AND DEVICES FOR ADJUSTING AN AVATAR BASED ON SOCIAL MEDIA ACTIVITY

(71) Applicant: AT&T Intellectual Property I, L.P., Atlanta, GA (US)

(72) Inventors: Rashmi Palamadai, Naperville, IL (US); Richard Palazzo, Stewartsville, NJ (US); Ari Craine, Marietta, GA (US); Eric Zavesky, Austin, TX (US); Oliver Spatscheck, Denison, TX (US); Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 121 days.

(21) Appl. No.: 18/062,709

(22) Filed: Dec. 7, 2022

(65) Prior Publication Data

US 2024/0193881 A1 Jun. 13, 2024

(51) Int. Cl.
*G06T 19/20* (2011.01)
*G06Q 10/40* (2026.01)

(52) U.S. Cl.
CPC ............. *G06T 19/20* (2013.01); *G06Q 10/40* (2026.01)

(58) Field of Classification Search
None
See application file for complete search history.

(56) References Cited

U.S. PATENT DOCUMENTS

| | | | | |
|---|---|---|---|---|
| 9,684,430 | B1 * | 6/2017 | Perigault | G06F 3/0237 |
| 12,315,057 | B2 * | 5/2025 | Beith | G06V 40/20 |
| 2013/0282808 | A1 * | 10/2013 | Sadanandan | G06Q 10/10 709/204 |
| 2014/0160149 | A1 * | 6/2014 | Blackstock | A63F 13/79 345/619 |
| 2021/0097745 | A1 * | 4/2021 | Monroy-Hernández | G06Q 50/01 |
| 2024/0062328 | A1 * | 2/2024 | Kwatra | G06N 3/006 |
| 2024/0078732 | A1 * | 3/2024 | Beith | G06V 20/41 |
| 2024/0087272 | A1 * | 3/2024 | Benzies | A63F 13/52 |
| 2024/0129437 | A1 * | 4/2024 | Zhang | G06T 13/00 |
| 2024/0177389 | A1 * | 5/2024 | Park | G06T 19/00 |
| 2024/0221270 | A1 * | 7/2024 | Leyton | A63F 13/92 |

* cited by examiner

*Primary Examiner* — Jeffrey J Chow
(74) *Attorney, Agent, or Firm* — Guntin & Gust, PLC; Bryan S. Latham

(57) ABSTRACT

Aspects of the subject disclosure may include, for example, receiving first data associated with an avatar of a first user, and identifying first media content associated with the first user provided to a first social media server. The first social media server presents the first media content and the avatar on a first social media site. Further embodiments can include analyzing the first media content resulting in an analysis, generating second data associated with an adjusted avatar based on the analysis and the first data associated with the avatar, and providing the second data to the first social media server. The first social media server ceases presenting the avatar on the first social media site and presents the adjusted avatar on the first social media site according to the second data. Other embodiments are disclosed.

20 Claims, 17 Drawing Sheets

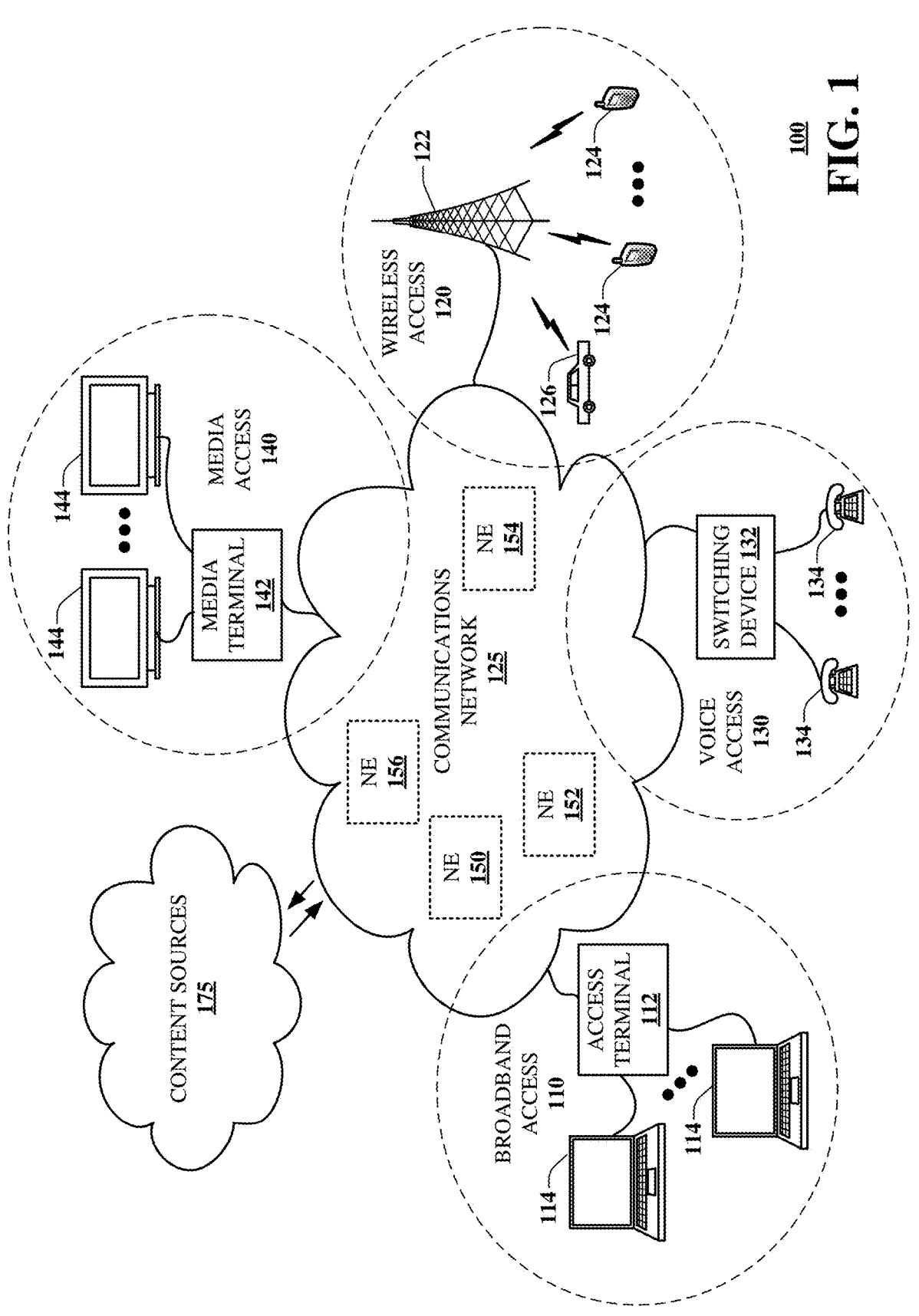
WIRELESS ACCESS 120
122
124
124
126
MEDIA ACCESS 140
144
144
MEDIA TERMINAL 142
COMMUNICATIONS NETWORK 125
NE 154
NE 156
NE 150
NE 152
SWITCHING DEVICE 132
VOICE ACCESS 130
134
134
CONTENT SOURCES 175
BROADBAND ACCESS 110
ACCESS TERMINAL 112
114
114
100  FIG. 1

200-1

200-2

200-3

200-5

200-6

200-7

200-8

200-9

200-10

200-11

230

300

600

METHODS, SYSTEMS, AND DEVICES FOR ADJUSTING AN AVATAR BASED ON SOCIAL MEDIA ACTIVITY

FIELD OF THE DISCLOSURE

The subject disclosure relates to methods, systems, and devices for adjusting an avatar based on social media activity.

BACKGROUND

In the current state of the art, managing an avatar can be cumbersome for a user to make real-time adjustments to their avatar that reflects their current mood or thoughts as reflected in their social media activity. Further, it is more cumbersome to proliferate such an adjusted avatar over a number of social media sites, gaming platforms, etc. on which the user may want to replace a previously generated and presented avatar with the adjusted avatar.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

DETAILED DESCRIPTION

Figure 2A:
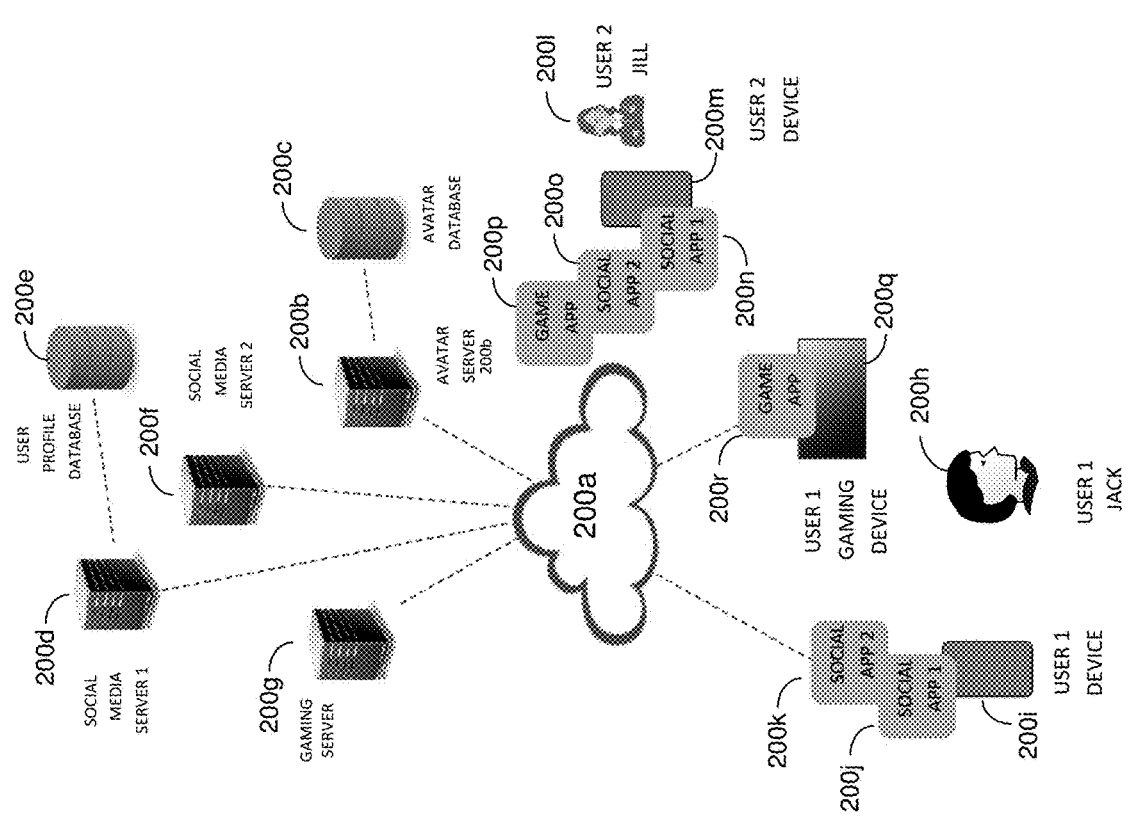
FIG. 2A-2K are block diagrams illustrating example, non-limiting embodiments of a system functioning within the communication network of FIG. 1 in accordance with various aspects described herein.

The subject disclosure describes, among other things, illustrative embodiments for receiving first data associated with an avatar of a first user, and identifying first media content associated with the first user provided to a first social media server. The first social media server presents the first media content and the avatar on a first social media site. Further embodiments can include analyzing the first media content resulting in an analysis, generating second data associated with an adjusted avatar based on the analysis and the first data associated with the avatar, and providing the second data to the first social media server. The first social media server ceases presenting the avatar on the first social media site and presents the adjusted avatar on the first social media site according to the second data. Other embodiments are described in the subject disclosure.

One or more aspects of the subject disclosure include a device, comprising a processing system including a processor, and a memory that stores executable instructions that, when executed by the processing system, facilitate performance of operations. The operations can comprise receiving first data associated with an avatar of a first user, and identifying first media content associated with the first user provided to a first social media server. The first social media server presents the first media content and the avatar on a first social media site. Further operations can comprise analyzing the first media content resulting in an analysis, generating second data associated with an adjusted avatar based on the analysis and the first data associated with the avatar, and providing the second data to the first social media server. The first social media server ceases presenting the avatar on the first social media site and presents the adjusted avatar on the first social media site according to the second data.

One or more aspects of the subject disclosure include a non-transitory, machine-readable medium, comprising executable instructions that, when executed by a processing system including a processor, facilitate performance of operations. The operations can comprise receiving first data associated with an avatar of a first user, and identifying first media content associated with the first user provided to a first social media server. The first social media server presents the first media content and the avatar on a first social media site. Further operations can comprise analyzing the first media content resulting in an analysis, generating second data associated with an adjusted avatar based on the analysis and the first data associated with the avatar, and providing the second data to a second social media server. In addition, the second social media server previously presented second media content associated with the first user with the avatar on a second social media site, and the second social media server replaces the avatar with the adjusted avatar according to the second data.

One or more aspects of the subject disclosure include a method. The method can comprise receiving, by a processing system including a processor, first data associated with an avatar of a first user, and identifying, by the processing system, first media content associated with the first user provided to a first social media server. The first social media server presents the first media content and the avatar on a first social media site. Further, the method can comprise analyzing, by the processing system, the first media content resulting in an analysis, generating, by the processing system, second data associated with an adjusted avatar based on the analysis and the first data associated with the avatar, and providing, by the processing system, the second data to the first social media server. In addition, the first social media server determines that the avatar is being presented on a second communication device associated with a second user utilizing a first social media application associated with the first social media server and the first social media site, the first social media server provides the second data to the second communication device associated with the second user, and the second communication device replaces the avatar with the adjusted avatar according to the second data utilizing the first social media application.

Referring now to FIG. 1, a block diagram is shown illustrating an example, non-limiting embodiment of a system 100 in accordance with various aspects described herein. For example, system 100 can facilitate in whole or in part adjusting an avatar associated with a user based on user social media activity. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A-2K are block diagrams illustrating example, non-limiting embodiments of a system functioning within the communication network of FIG. 1 in accordance with various aspects described herein.

One or more embodiments enable the generation and modification/adjustment of avatars used to represent a user based on the activities of the user in social media or other online activities. The avatar may be a representation of the user based on the user's real-time control of the avatar, the avatar may be another representation of the user, or it may be acting independently or semi-independently on behalf of the user. Further embodiments analyze a user's communication activities, such as social media activities, and updates or adjusts an avatar that is active and represents the user across a number of different platforms or applications. The adjusted avatar may be used in static representations, such as for profile pictures, or dynamic and animated uses, such as within a gaming application or other applications.

Referring to FIG. 2A, in one or more embodiments, system 200-1 can comprise a communication network 200a that communicatively couples a first social media server 200d along with its associated user profile database 200c, a second social media server 200f, a gaming server 200g, and an avatar server 200b and its associated avatar database 200c with a first user device 200i associated with a first user 200h, a gaming device 200q associated with the first user, and a second user device 200m associated with a second user 200l. The first user device 200i can utilize a first social media application 200j associated with the first social media server 200d and a second social media application 200k associated with the second social media server 200f. The gaming device 200q can utilize a gaming application 200r associated with the gaming server 200g. The second user device 200m can utilize a first social media application 200n associated with the first social media server 200d, a second social media application 200o associated with the second social media server 200f, and a gaming application 200p associated with the gaming server 200g. The communication network 200a can comprise one or more wireless communication networks, one or more wired communication networks, or a combination thereof. Further the communication network 200a can represent a portion of the Internet. Each of first social media server 200d, user profile database 200e, second social media server 200f, gaming server 200g, avatar server 200b and avatar database 200c can comprise one or more servers in one location, one or more servers spanning multiple locations, one or more virtual servers in one location, one or more virtual servers spanning multiple locations, and one or more cloud servers. Further each of a first user device 200i, gaming device 200q and second user device 200m can comprise a communication device, mobile device, mobile phone, smartphone, laptop computer, tablet computer, smartwatch, wearable device, gaming device, virtual reality device, augmented reality device, cross reality device, or any combination thereof.

In one or more embodiments, a first user 200h and a second user 200l may be equipped with the first user device 200i, gaming device 200q, and second user device 200m on which they may participate via applications in activities such as games, social media, messaging, etc. Each application on the user device is in communication with a corresponding server over communication network 200a. A first social media server 200*d* may also be communicatively coupled with a user profile database 200*e* that contains a set of data for each user that includes historical data representing the users' use of the first social media application. Further, the avatar server 200*b* can be communicatively coupled with the avatar database 200*c* that is used to store data representing one or more avatars for each user.

Figure 2B:
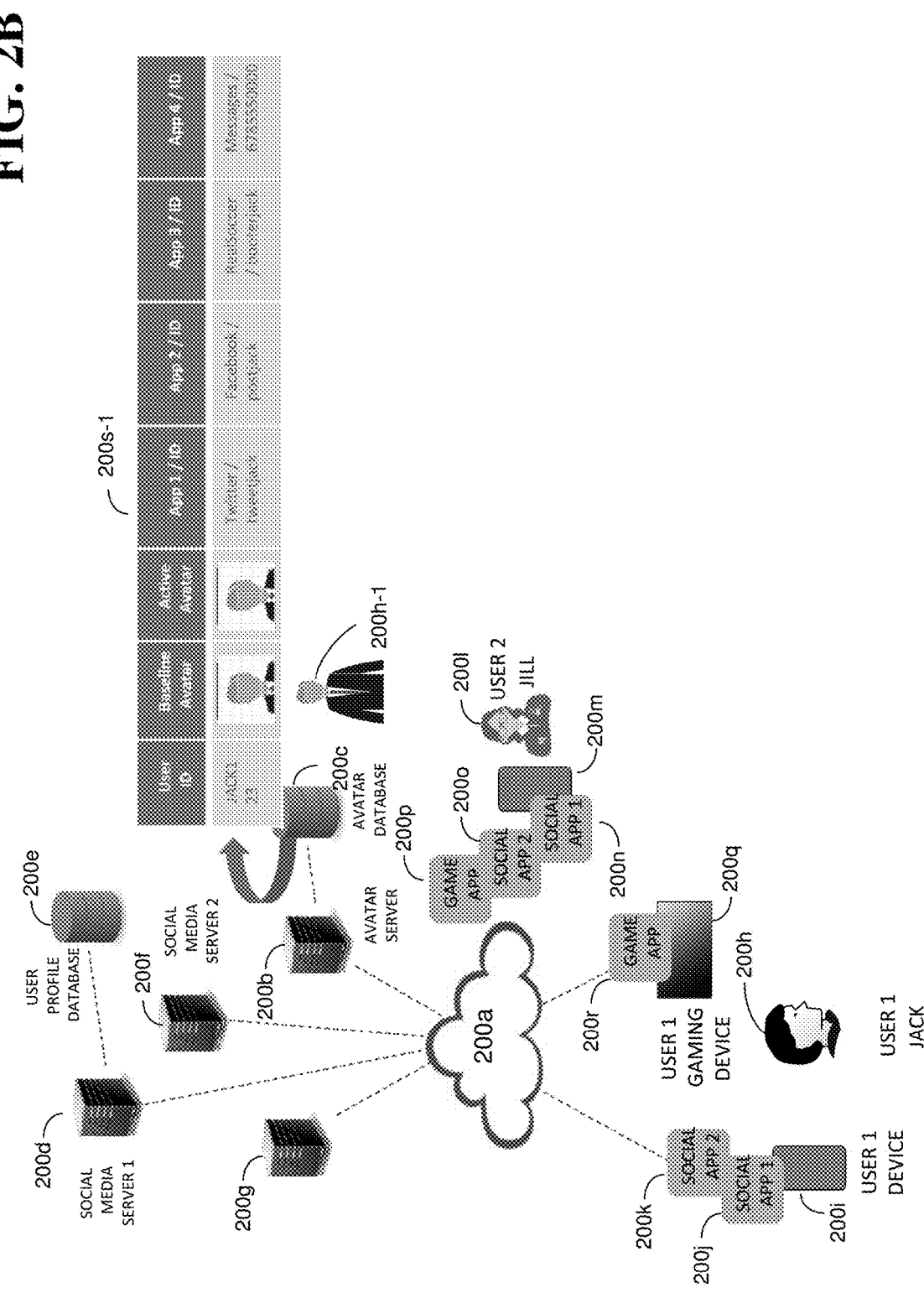

Referring to FIG. 2B, in one or more embodiments, a user may create or generate a baseline avatar 200*h*-1. That is, a first user 200*h* can log into the avatar server 200*b* and use it to create a baseline avatar 200*h*-1 for themselves. This may be done in any of a number of ways, including utilizing a respective social media application, an avatar generating application associated with the avatar server 200*b*, photo application, etc. that includes making selections about skin tone, facial features, attire, and other aspects of the visible representation of the baseline avatar 200*h*-1. Further, data 200*s*-2 representing the baseline avatar 200*h*-1 can be stored in the avatar database 200*c*. There may be more than one representation of the baseline avatar 200*h*-1, for example, a head and shoulder view only and a full body view.

In creating the data 200*s*-1 for the first user 200*h* in the avatar database 200*c*, the first user 200*h* can also provide the avatar server 200*b* with one or more other applications, and an ID for the first user 200*h* for each application. These then represent the applications for which the first user 200*h* would like their active avatar from the avatar database 200*c* to be applied. By default, the baseline avatar 200*h*-1 can be the active avatar.

Figure 2C:
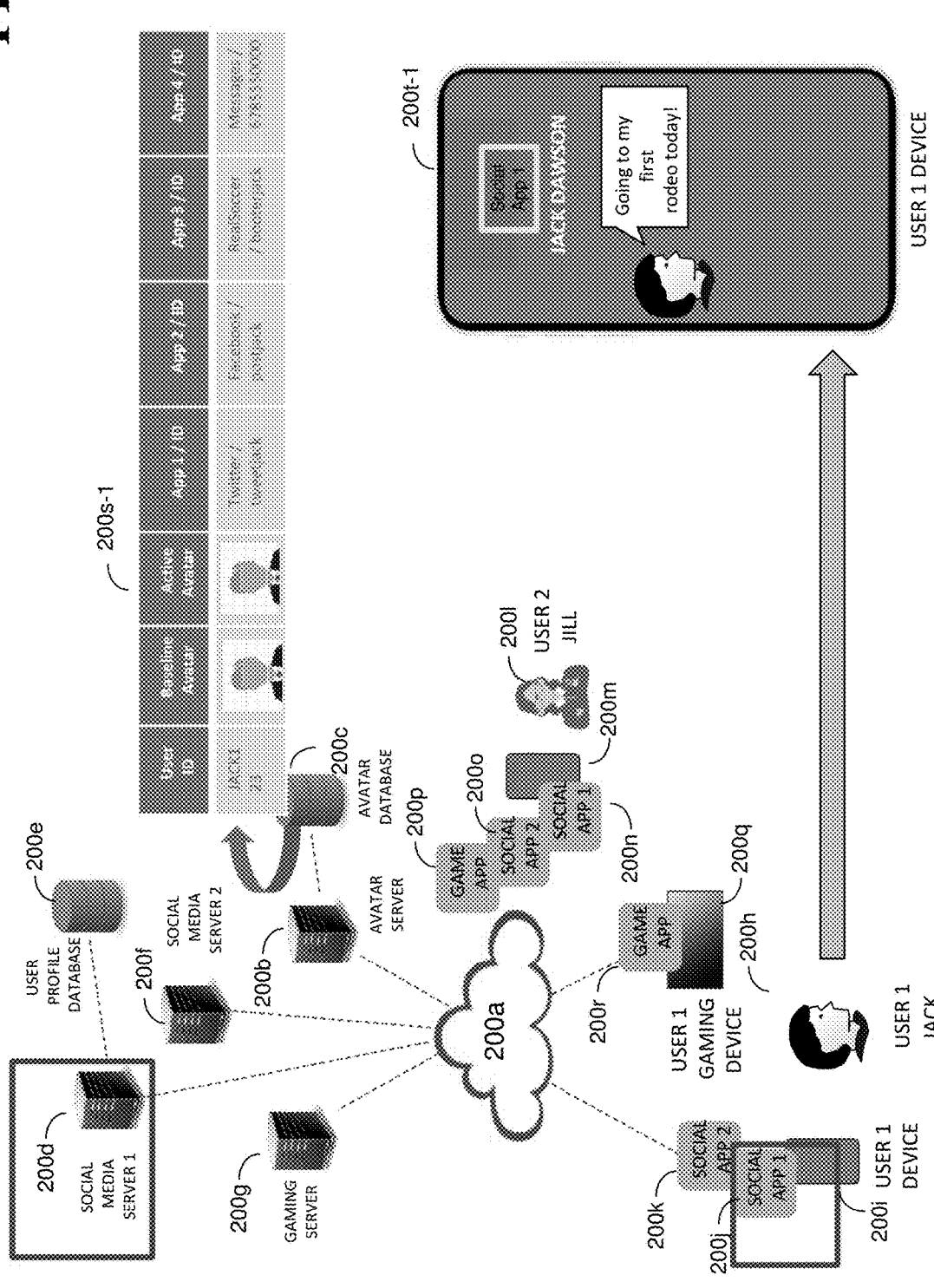

Referring to FIG. 2C, one or more embodiments can detect social media activity in a first social media application 200*j*. A first user 200*h* may engage in activity (e.g., posting of media content) using the first social media application 200*j* on the first social media server 200*d*. The first social media server 200*d* may periodically or continuously monitor the content of the user's activity. For example, the first user 200*h* may post, as shown in the user interface 200*t*-1 of the first social media application 200*j*, a message on a first social media site associated with the first social media server 200*d* and the first social media application 200*j* about their plans to attend an upcoming event (e.g., rodeo).

Figure 2D:
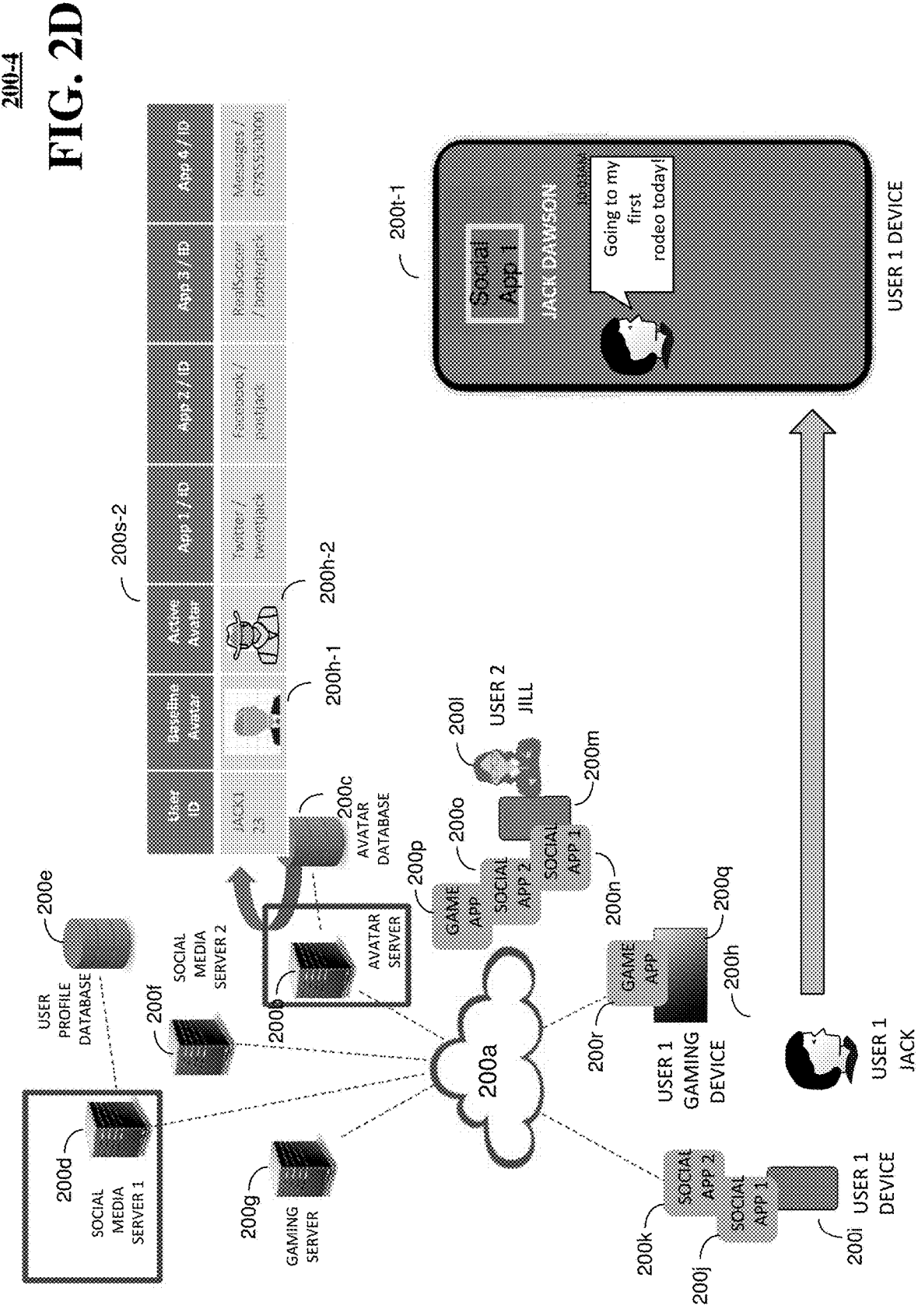

Referring to FIG. 2D, one or more embodiments can analyze the social media activity (e.g., posting media content) of first user 200*h*. In some embodiments, the first social media server 200*d* can analyze this social media activity using any of a number of methods, such as artificial intelligence or machine learning techniques, to make a determination that a post's content represents planned activity, or another topic or subject matter of current interest to the user. Further, first social media server 200*d* can send, the post, or a message, which may include keywords that are representative of the topic or subject matter of current interest to the user regarding the post to the avatar server 200*b* to adjust the baseline avatar that are aligned with the content of the post. The post can comprise media content that includes textual content, audio content, image content, and video content. For example, the analyzing the textual content of the post that includes "going to a rodeo today" can result in the avatar server 200*b* in adjusting the baseline avatar 200*h*-1 to a cowboy-styled avatar 200*h*-1, using the baseline avatar as a reference.

Figure 2E:
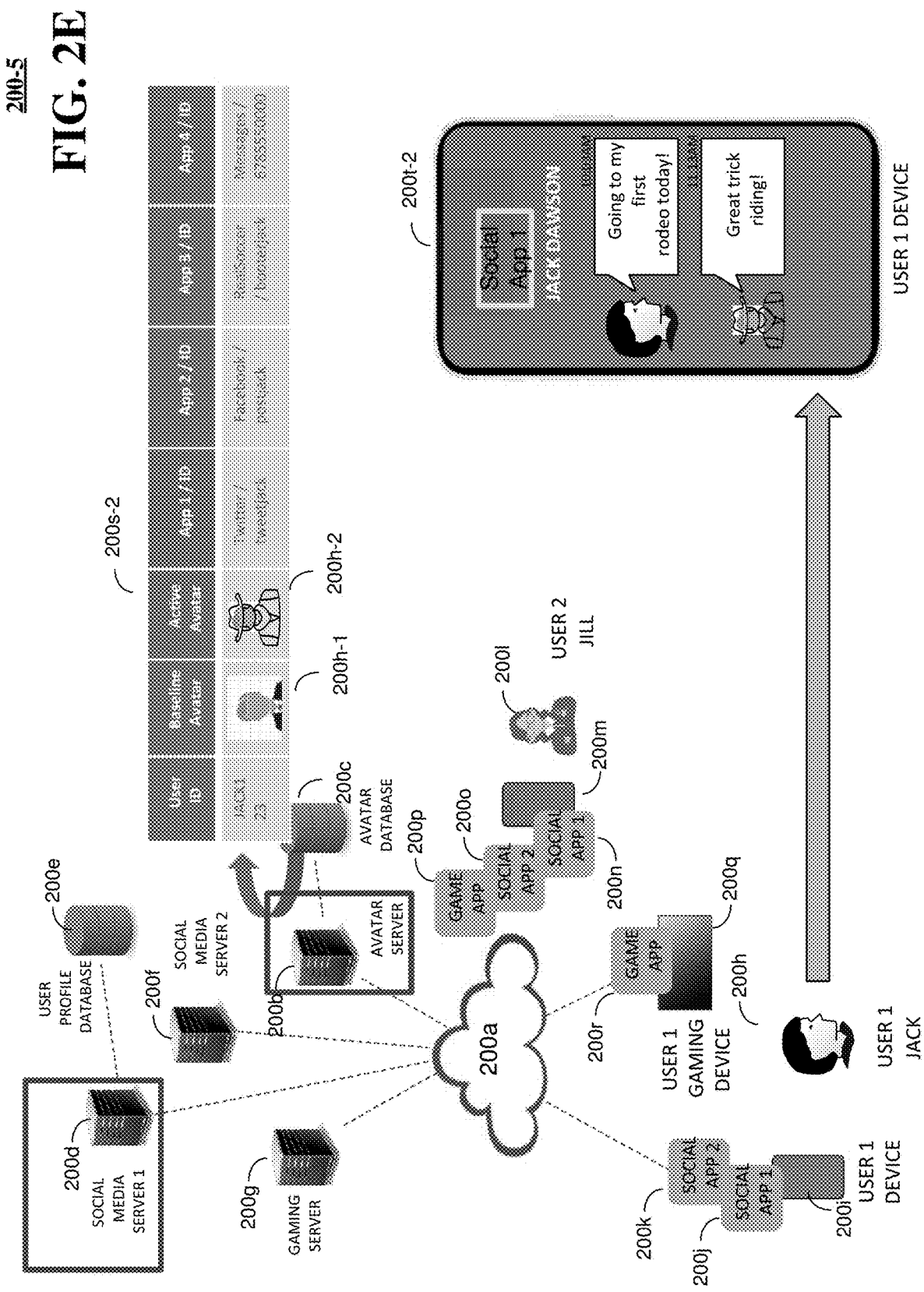

Referring to FIG. 2E, one or more embodiments can modify or adjust the baseline avatar 200*h*-1 associated with the first user 200*h* within the first social media application 200*j*/first social media site associated with the first social media server 200*d*. That is, the avatar server 200*b*, having adjusted the baseline avatar 200*h*-1 to an adjusted avatar

200*h*-2 and made it the new active avatar, can provide data describing the adjusted avatar (e.g., active avatar) to first social media server 200*d*. The avatar server 200*b* can use the user ID for the first user 200*h* to associate the adjusted avatar 200*h*-2 with that user ID within the first social media server 200*d*. Further, the first social media server 200*d*, in subsequent use by the user, can use the adjusted avatar 200*h*-2 for any avatar presentation representing first user 200*h*, as shown in user interface 200*t*-2 of the first social media application 200*j*.

Figure 2F:
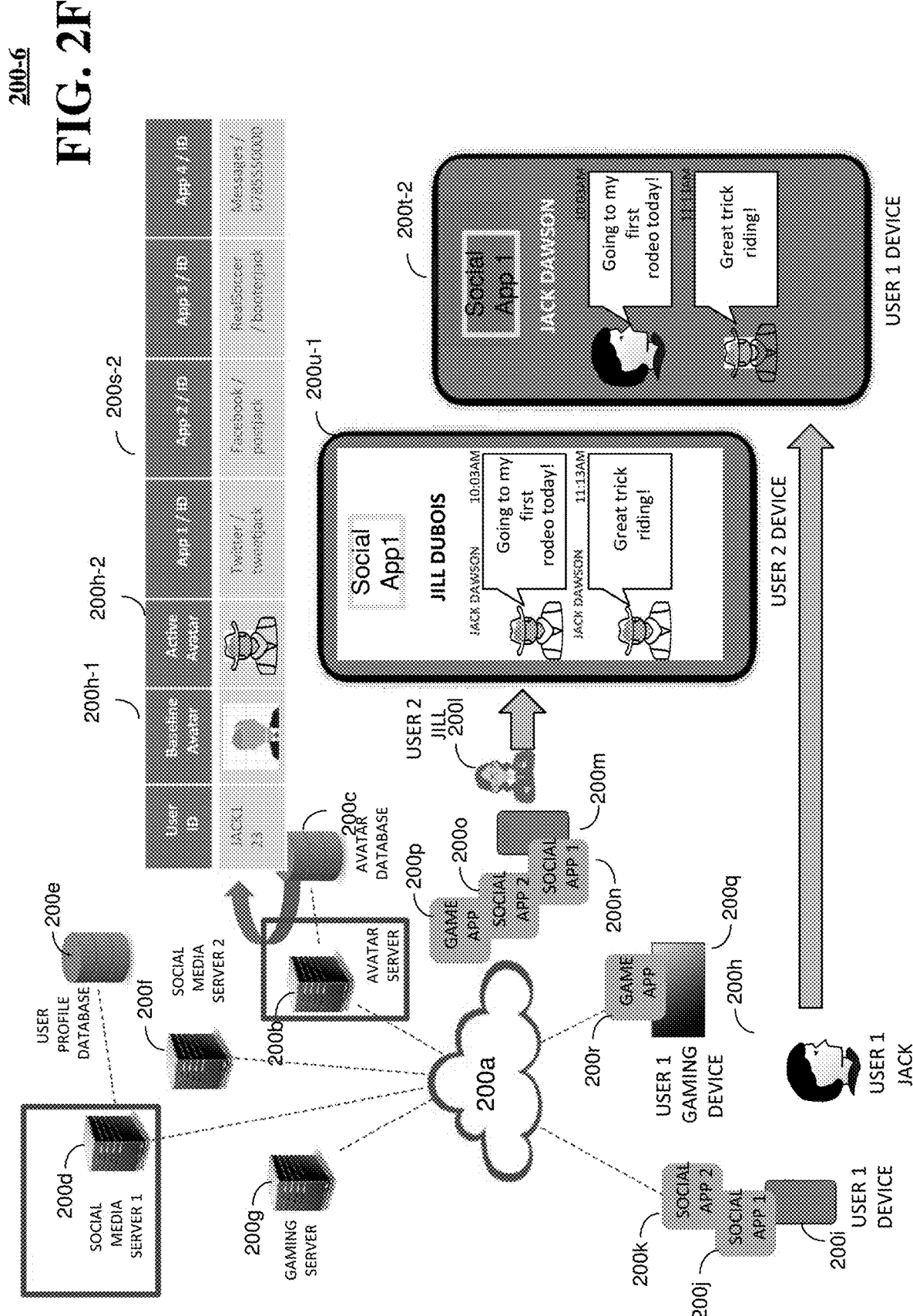

Referring to FIG. 2F, in one or more embodiments, the first social media server 200*d* can also use the adjusted avatar 200*h*-2 for first user 200*h* in presentation of any representation of an avatar representing the first user 200*h* to second user 200*l*, as shown in user interface 200*u*-1 of first social media application 200*n*.

Further, the adjusted avatar 200*h*-2 can remain in place as the active avatar for use by the first social media application 200*j* until such a point in time when other social media activity associated with the first user 200*h* is analyzed and determined to make a change to the active avatar (adjust the avatar again), or, in some embodiments, the adjusted avatar may remain in place for a specified period of time (e.g., which can be configurable by the first user 200*h*) and then revert back to the baseline avatar 200*h*-1.

Figure 2G:
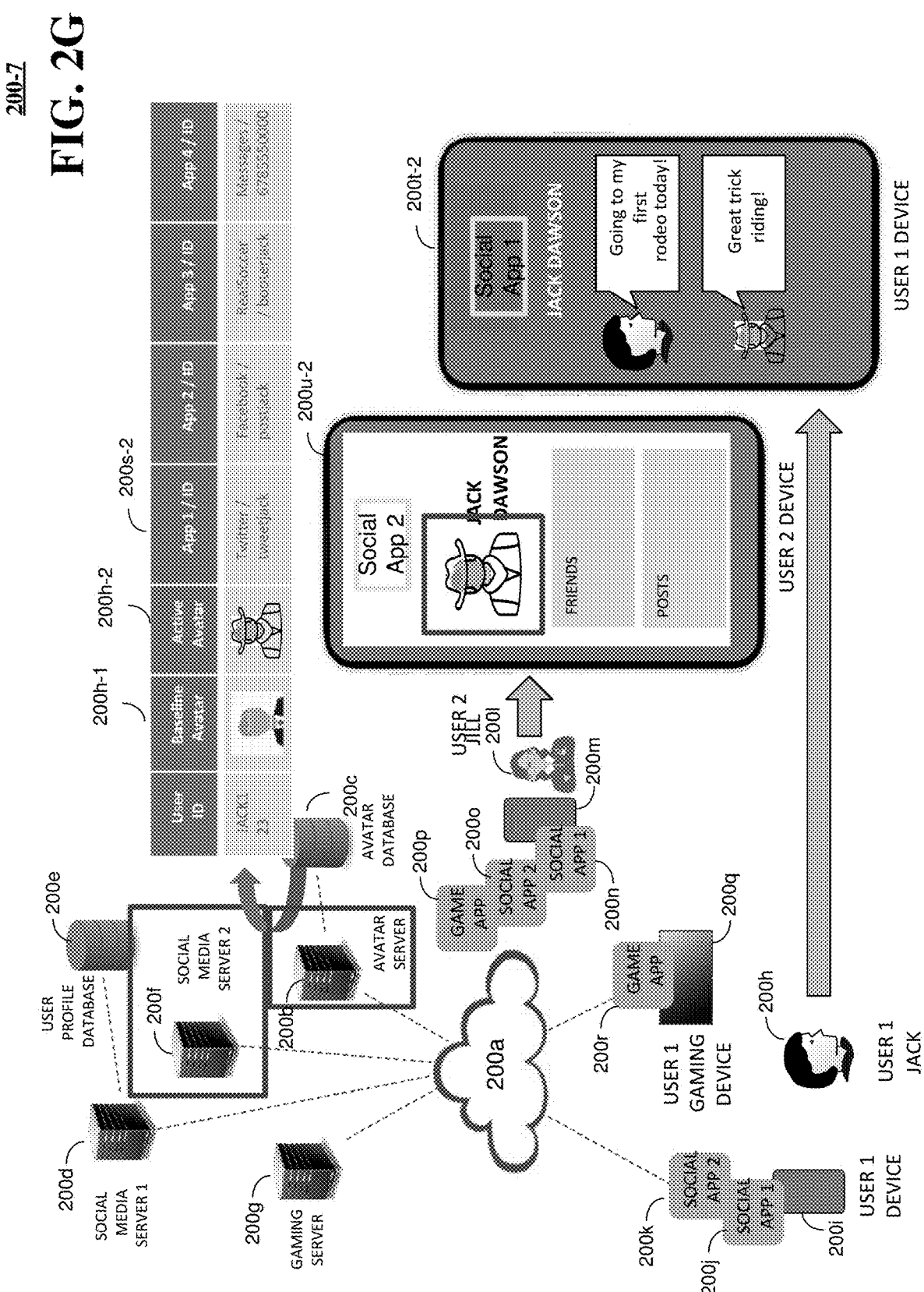

Referring to FIG. 2G, one or more embodiments can adjust the avatar of the first user 200*h* in a second social media application 200*k*. That is, when a second social media server 200*f* is invoked using a user profile for first user 200*h*, the second social media server 200*f* can query the avatar server 200*b* to request the active avatar based on the user ID for first user 200*h*. The avatar server 200*b* can provide data representing the adjusted avatar, accordingly.

For example, if the second social media application 2000 is invoked by the second user 200*l*, and the invoked activity involves a presentation of an avatar associated with the first user 200*h* by the second social media server 200*f*, then the adjusted avatar 200*h*-2 that was created/generated using an analysis of the first user 200*h* social media activity on first social media server 200*d* can be used by the second social media server 200*f* in presenting the adjusted avatar 200*h*-2 for the first user 200*h* to the second user 200*l* on user interface 200*u*-2 of the second social media application 2000.

Figure 2H:
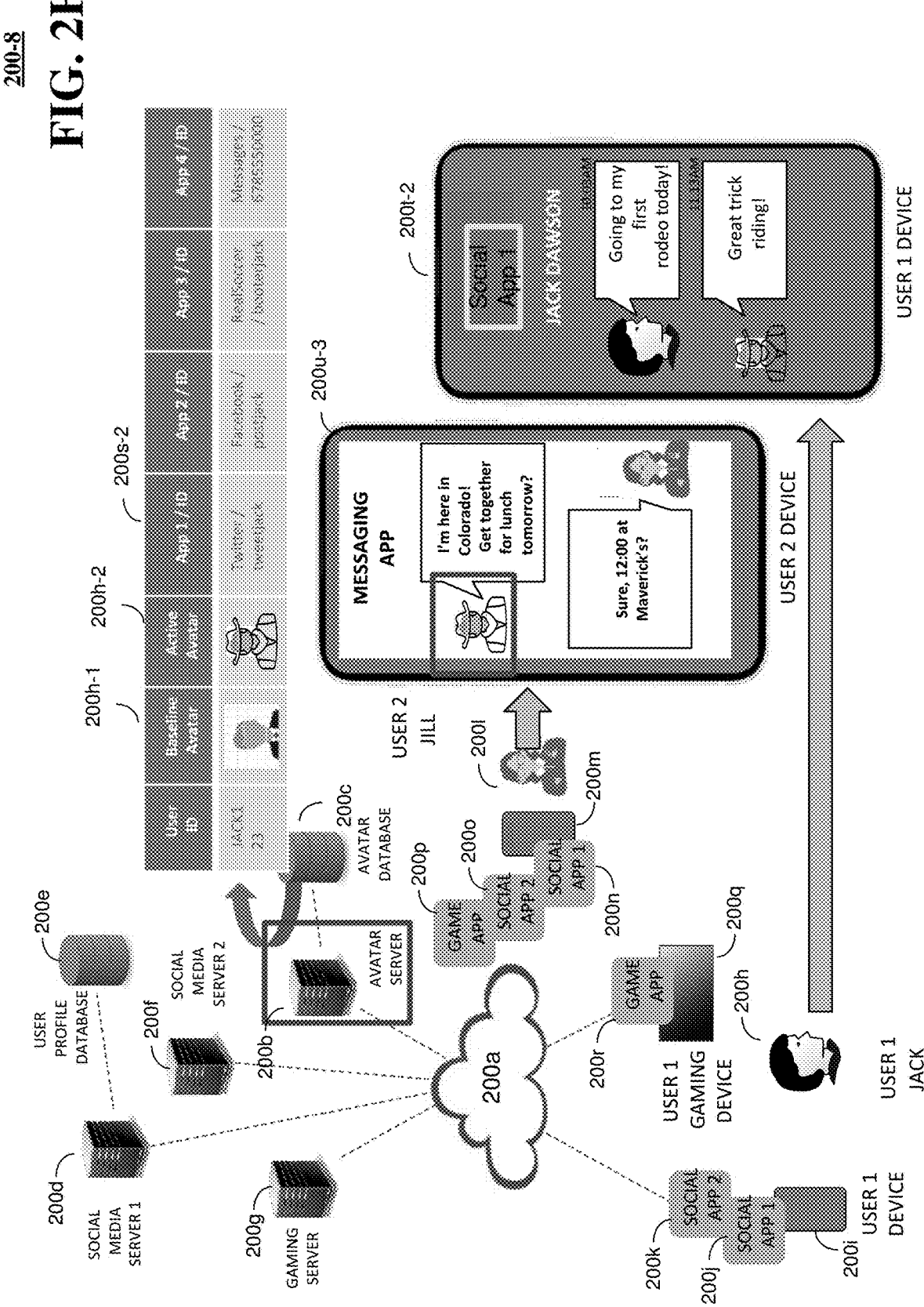

Referring to FIG. 2H, in one or more embodiments, the second social media server 200*f* can be associated with a messaging application associated with another social media server. Thus, this second social media server 200*f* can provide data associated with the adjusted avatar 200*h*-2 to the second user device 200*m* to present to the adjusted avatar on user interface 200*u*-3 of the messaging application.

Figure 2I:
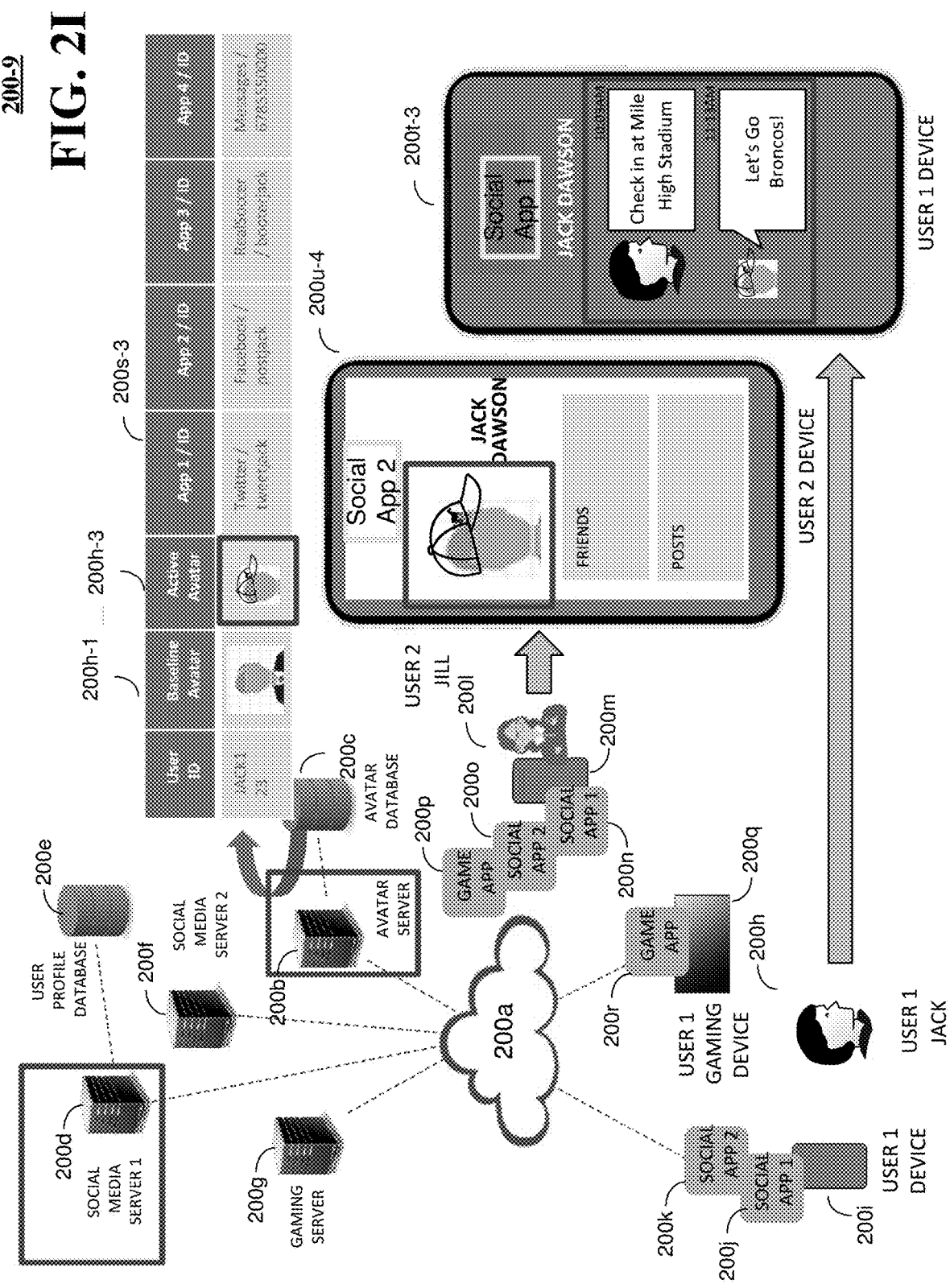

Referring to FIG. 2I, one or more embodiments can adjust an avatar based on several different factors. Other factors can also be used by the first social media application 200*j*. first social media server 200*d* in addition to an analysis of the media content of posted by the first user 200*h*. For example, if the first user 200*h* uses the first social media application 200*j* to check in at a location, for example a football stadium, then the location may be detected, and sent by first social media server 200*d* to the avatar server 200*b* and be used in the process of generating another adjusted avatar 200*h*-3 based on the location.

Another example can be an analysis of the contents of the user's activity on the first social media application 200*j* whereby the first social media application 200*j* may generate data representing an estimated mood of the user. This mood analysis can be used by the avatar server 200*b* in generated the adjusted avatar 200h-3 such as one that smiles more or looks grumpy, sleepy, bashful, etc. Further the adjusted avatar 200h-3 can be presented on user interface 200t-3 of the first social media application 200j on the first user device 200i and user interface 200u-4 on the second user device 200m of the first social media application 200n.

Figure 2J:
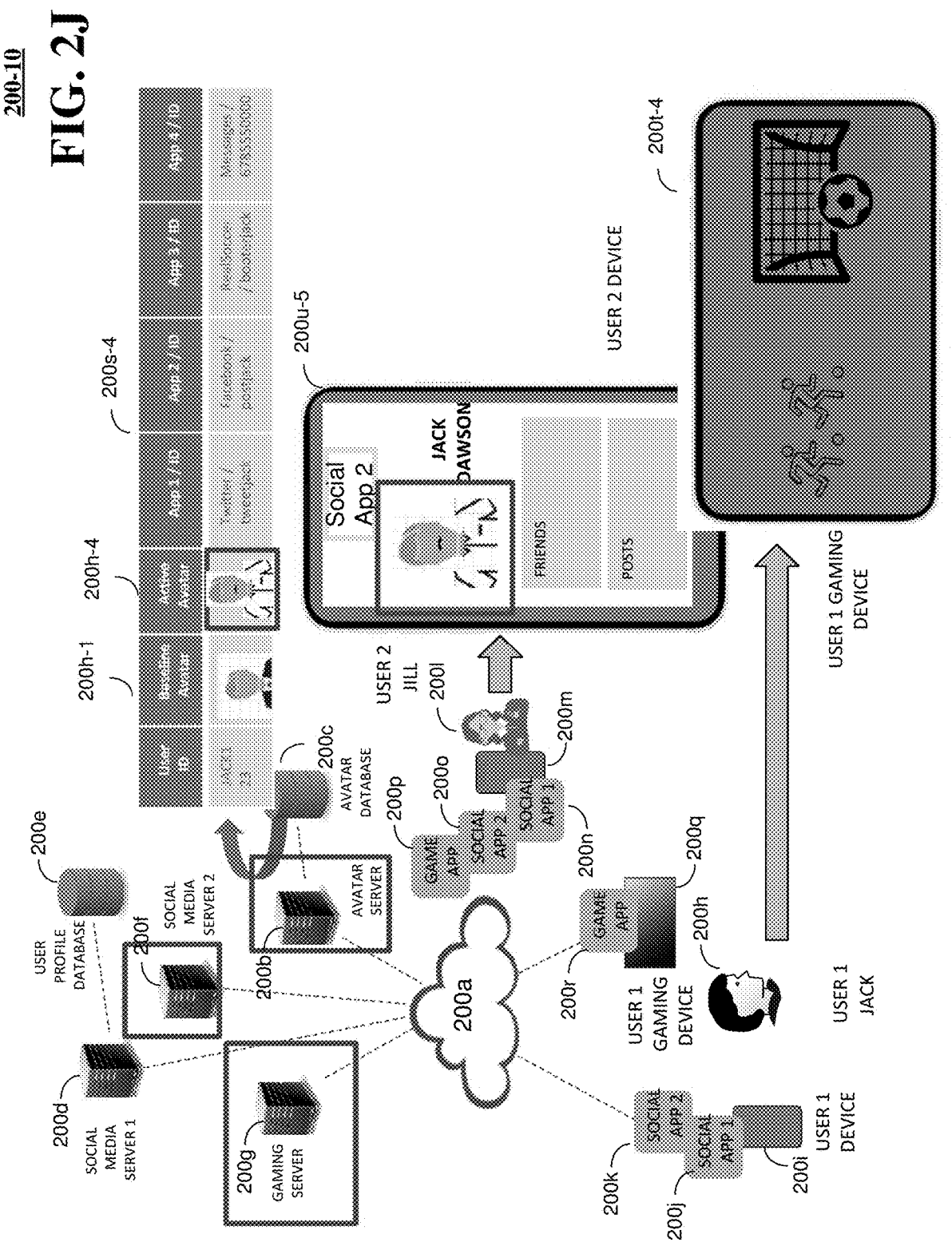

Referring to FIG. 2J, in one or more embodiments, a first user 200h can be using an avatar to participate in a gaming application 200r, for instance, an adjusted avatar 200h-4 that represents a soccer player version of themselves. This activity may be registered in the gaming server 200g and the gaming server 200g may register the adjusted avatar 200h-4 with the avatar server 200b for the first user 200h. Accordingly, other representations of the user as an avatar may likewise use the active adjusted avatar 200h-4 such as, for example, second user device 200m accesses the current active adjusted avatar 200h-4 for first user 200h via second social media application 2000 as shown in user interface 200u-5. In some embodiments, the active avatar for the first user 200h may revert back to the baseline avatar 200h-1 when they conclude participation in the gaming application 200r.

Figure 2K:
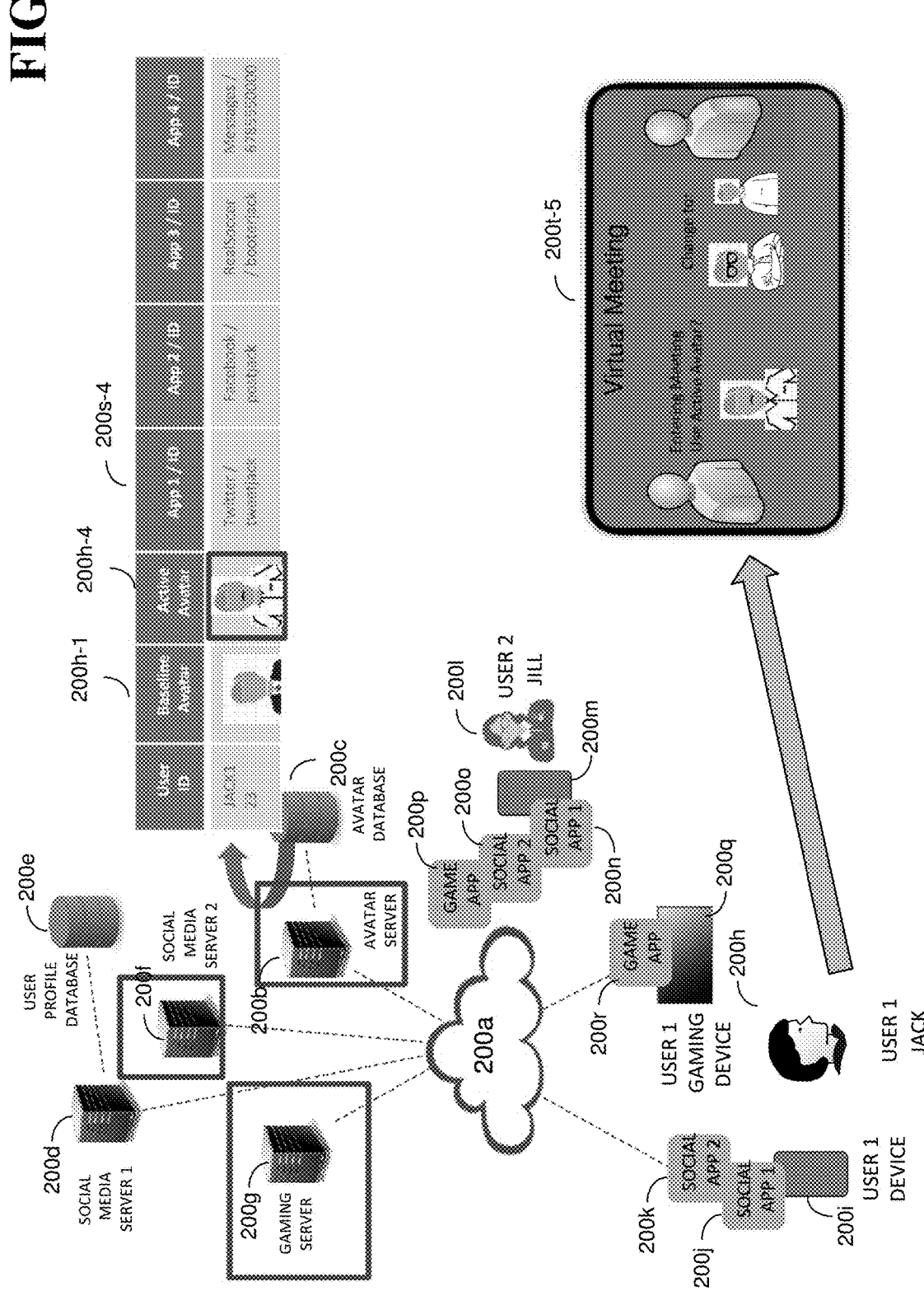

Referring to FIG. 2K, one or more embodiments, may alert first user 200h that the active avatar may not be appropriate in some social media applications. In some embodiments, the active adjusted avatar 200h-4 can remain active until the user specifies otherwise. For example, the first user 200h may need to be periodically reminded of the appearance of their current active avatar 200h-4. An alert can be presented to the first user 200h on the first user device 200i when the first user 200h invokes a social media application that can involve the use of an avatar to represent them. If the social media application comprises a virtual meeting application, when the first user 200h enters a virtual reality meeting, the first user 200h can be alerted as to their current active avatar and be presented with other avatar options that may be stored in the avatar database 200c as previous versions of avatars that the first user 200h has used, as shown in user interface 200t-5. This can allow the first user 200h to determine that the current active avatar 200h-4 may not be appropriate for the professional meeting held within the virtual meeting application and select the baseline avatar 200h-1, which may be more appropriate in a professional setting.

In one or more embodiments, the avatar server 200b can receive media content of a first user presented by the first social media server 200d, generate data for an adjusted avatar for the first user 200h based on the media content and send the data to the second social media server 200f such that the second social media server 200f presents the adjusted avatar for the first user 200h according to the data. In some embodiments, the first user 200h can configure management of avatars and adjusted avatars. Further, the first user 200h can provide user-generated input from the first user device 200i that indicates to the avatar server 200b to utilize only selective media content posted on social media applications to adjust their avatar. For example, the first user 200h can indicate that negative media content (e.g., rant) regarding a visit to the Dentist's office can be used to adjust their avatar but other negative media content (e.g., rant) regarding recent airplane service cannot be used to adjust their avatar.

In further embodiments, the first user 200h can receive an alert from avatar server 200b on first user device 200i that indicates whether to allow the avatar server 200b to replace their avatar on one or more social media applications to the adjusted avatar. In some embodiments, the alert can allow the first user 200h to change the preferences to presenting the adjusted avatar on one or more social media applications. In additional embodiments, the first user 200h can provide user-generated input to the avatar server 200b to select a portion of, and not all of, the social media connections (e.g., other social media users that can view the social media content of the first user 200h) to view the adjusted avatar in a specific social media site or social media application. In some embodiments, the avatar server can generate first data for a first adjusted avatar based on the analyzing of media content posted on a first social media site and generate second data for a second adjusted avatar based on the analyzing of the media content on the first social media site. The first adjusted avatar can be generated to be presented on more informal social media sites and the second adjusted avatar can be generated to be presented on more professional social media sites.

In other embodiments, the avatar server can generate an NFT associated with the baseline avatar or any adjusted avatar associated with the first user 200h.

Figure 2L:
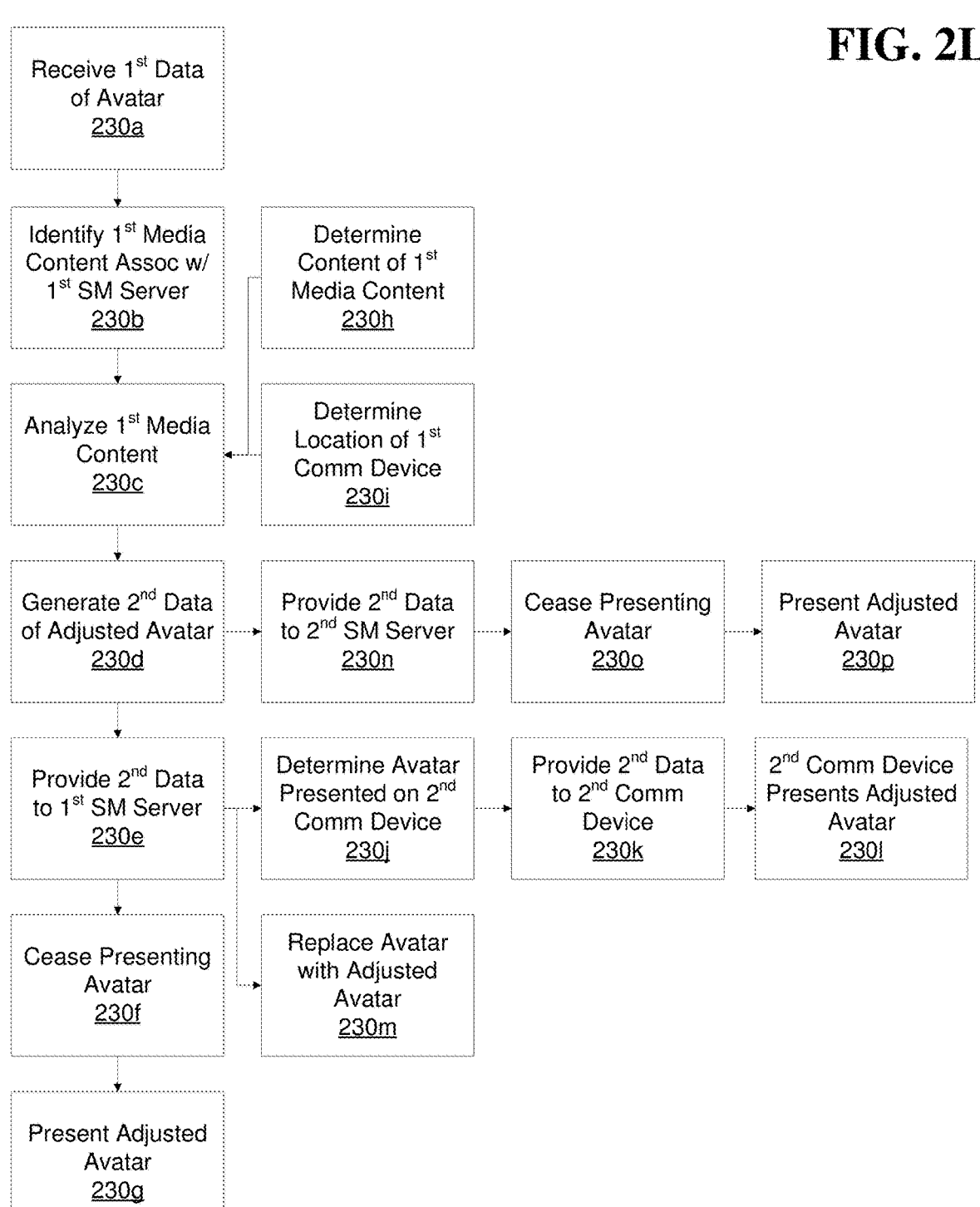
FIG. 2L depicts an illustrative embodiment of a method in accordance with various aspects described herein.

FIG. 2L depicts an illustrative embodiment of a method 230 in accordance with various aspects described herein. Aspects of method 230 can be implemented by ab avatar server, one or more social media servers, and one or more communication devices or user devices. The method 230 can include the avatar server, at 230a, receiving first data associated with an avatar of a first user. This can be from a first communication device associated with the first user on which the first user generates the avatar utilizing a software application (e.g., social media application, gaming application, avatar generating application, photo software application, etc.). Further, the method 230 can include the avatar server, at 230b, identifying first media content associated with the first user provided to a first social media server resulting in an identification. This identification can be performed by the first social media server providing the first media content to the avatar server or providing keywords that identify the first media content. The first social media server can present the first media content and the avatar on a first social media site. The first social media site can include a social media website, a social media mobile site, a social media virtual reality site, virtual meeting site, and/or a gaming site. In addition, the method 230 can include the avatar server, at 230c, analyzing the first media content resulting in an analysis. The first media content can include textual content, audio content, image content, video content, or a combination thereof. In some embodiments, the analyzing of the first media content comprises analyzing the textual content utilizing one or more textual content recognition techniques. In other embodiments, the analyzing of the first media content comprises analyzing the audio content utilizing one or more voice recognition techniques. In further embodiments, the analyzing of the first media content comprises analyzing the one of the image content and video content utilizing one or more image recognition techniques. Also, the method 230 can include the avatar server, at 230d, generating second data associated with an adjusted avatar based on the analysis and the first data associated with the avatar.

In one or more embodiments, the method 230 can include the avatar server, at 230c, providing the second data to the first social media server. Further, the method 230 can include the first social media server, at 230f, ceasing presenting the avatar on the first social media site and, at 230g, presenting the adjusted avatar on the first social media site according to the second data. In addition, the method 230 can include the avatar server, at 230h, determining context of first media content. In some embodiments, the analyzing of the first media content comprises determining context of first media content. Also, the method 230 can include the avatar server, at 230i, determining a location of a first communication device associated with the first user.

In one or more embodiments, the method 230 can include the first social media server, at 230j, determining that the avatar is being presented on a second communication device associated with a second user utilizing a first social media application associated with the first social media server and the first social media site. Further, the method 230 can include the first social media server, at 230k, providing the second data to the second communication device associated with the second user. In addition, the method 230 can include the second communication device, at 230l, replacing the avatar with the adjusted avatar according to the second data utilizing the first social media application.

In one or more embodiments, the first social media server has previously presented each of a group of media content associated with the first user with the avatar on the first social media site. Further, the method 230 can include the first social media server, at 230m, replacing the avatar associated with each of the group of media content with the adjusted avatar according to the second data.

In one or more embodiments, the method 230 can include the avatar server, providing the second data to a second social media server. Further, the method 230 can include the second social media server, at 2300, ceasing presenting the avatar on a second social media site with second media content associated with the first user, and, at 230p, presenting the adjusted avatar on the second social media site with the second media content according to the second data. The second social media site can include a social media website, a social media mobile site, a social media virtual reality site, virtual meeting site, and/or a gaming site.

While for purposes of simplicity of explanation, the respective processes are shown and described as a series of blocks in FIG. 2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more blocks may be performed in response to one or more other blocks.

Portions of some embodiments can be combined with portions of other embodiments.

Figure 3:
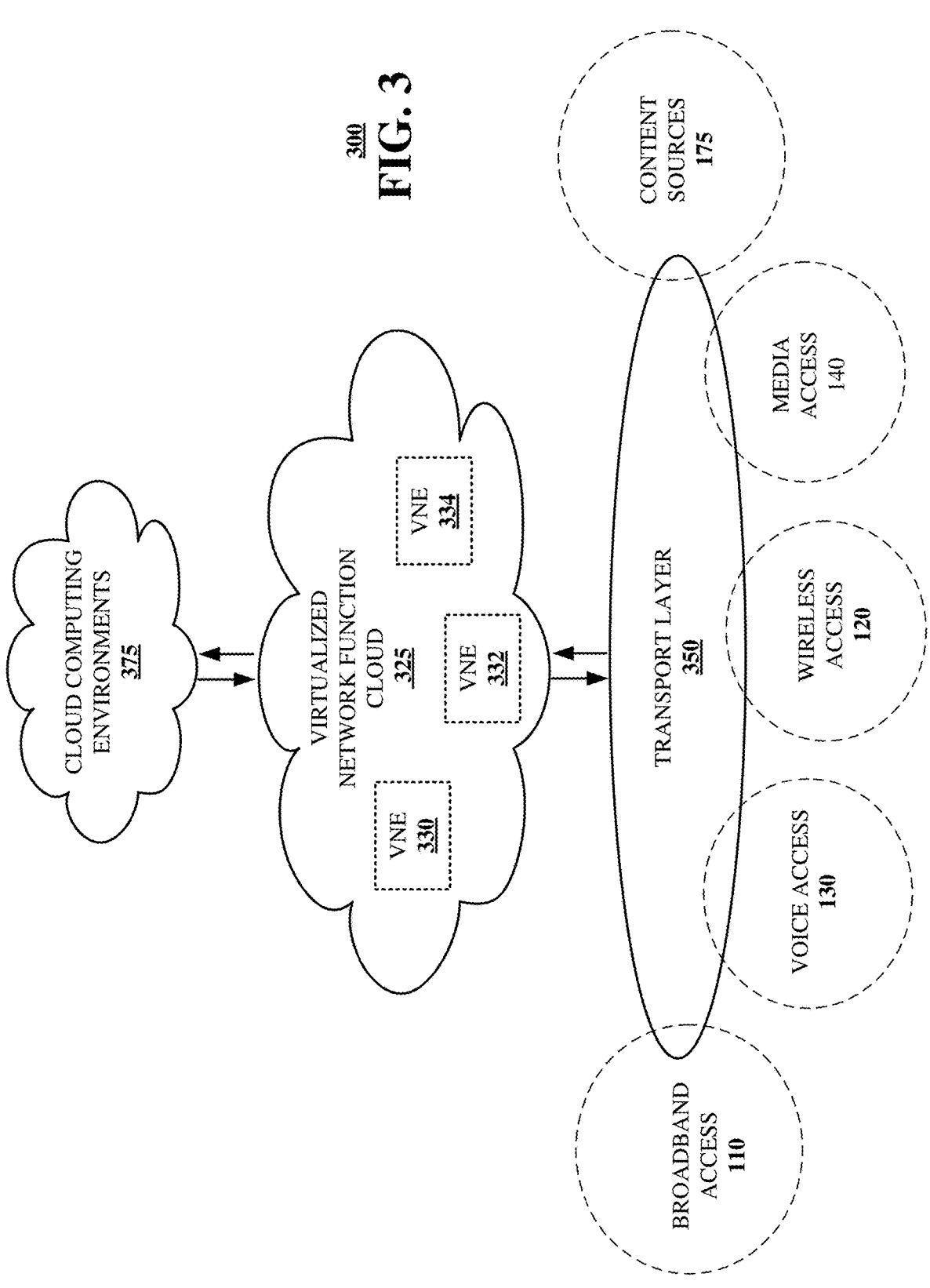
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200-1, 200-2, 200-3, 200-4, 200-5, 200-6, 200-7, 200-8, 200-9, 200-10, and 200-11, and method 230 presented in FIGS. 1, 2A-2L, and 3. For example, virtualized communication network 300 can facilitate in whole or in part adjusting an avatar associated with a user based on user social media activity.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
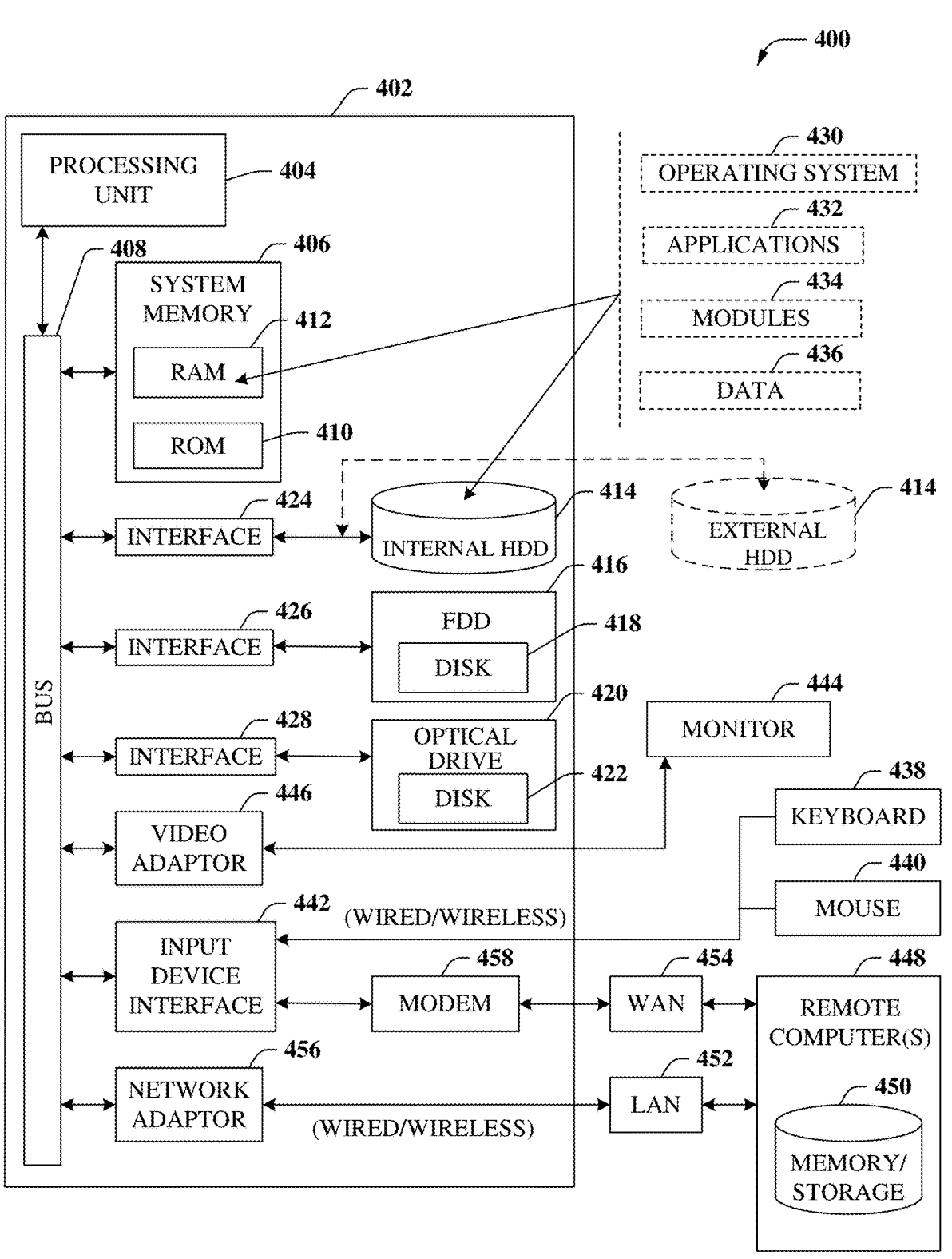
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part adjusting an avatar associated with a user based on user social media activity. Further, each of first user device 200*i*, second user device, 200*m*, gaming device 200*q*, gaming server 200*g*, first social media server 200*d*, second social media server 200*f*, user profile database 200*c*, avatar server 200*b*, and avatar database 200*c* comprises computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
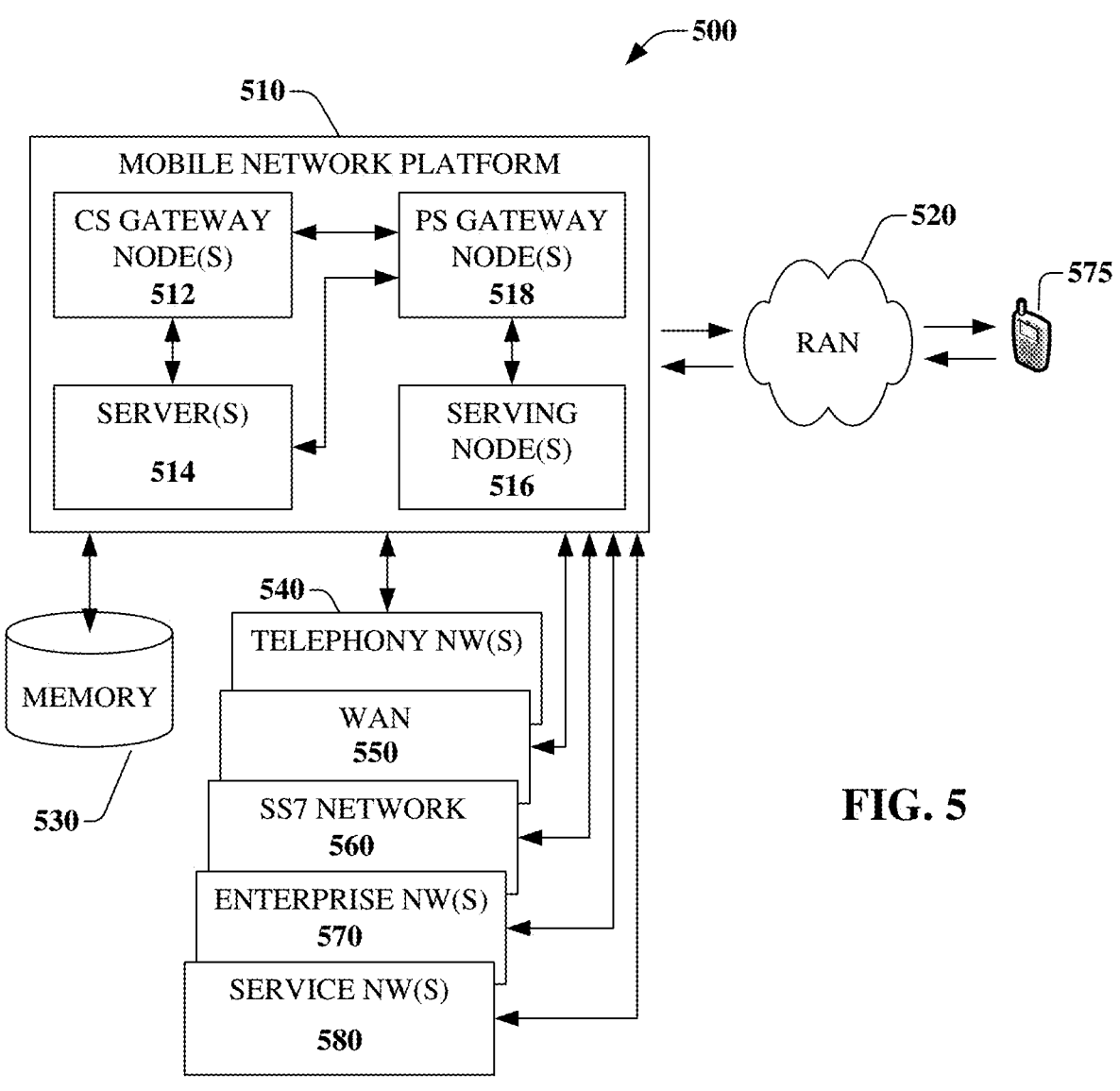
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part adjusting an avatar associated with a user based on user social media activity. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
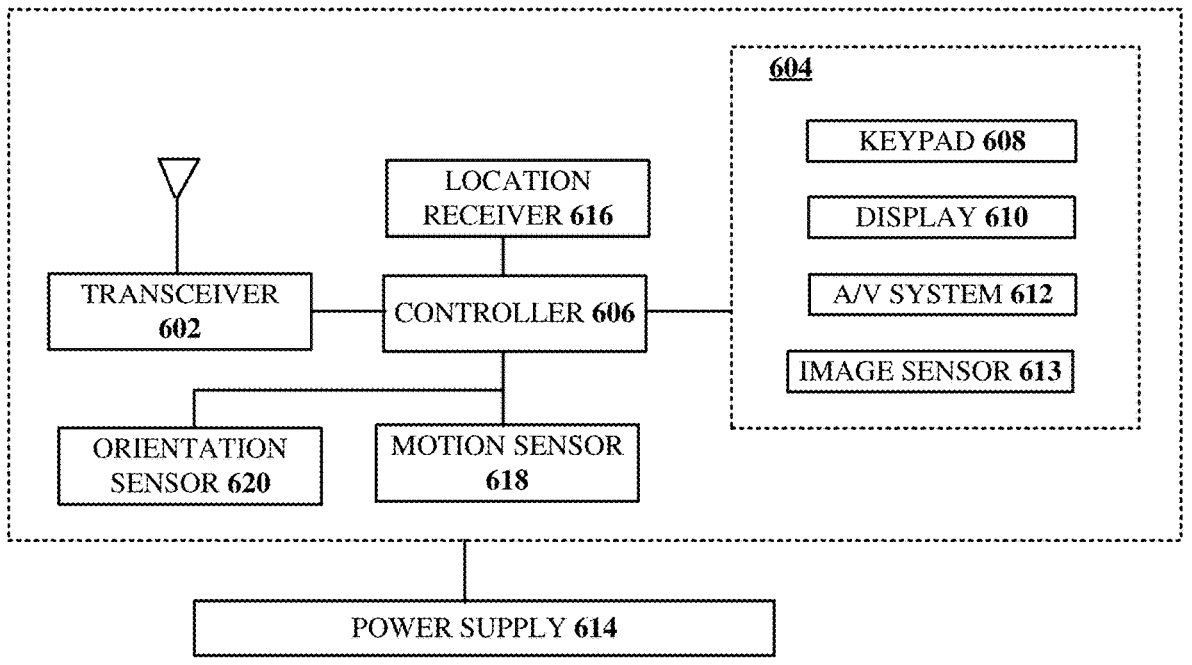
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part adjusting an avatar associated with a user based on user social media activity. Further, each of first user device 200*i*, second user device, 200*m*, gaming device 200*q*, gaming server 200*g*, first social media server 200*d*, second social media server 200*f*, user profile database 200*e*, avatar server 200*b*, and avatar database 200*c* comprises communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving management data associated with an avatar of a first user, the management data comprising user input that specifies a selective media content type, posted on social media, which is allowed to be used to adjust the avatar;

identifying first media content associated with social media activity of the first user provided to a first social media server, wherein the first social media server presents the first media content and the avatar on a first social media site;

analyzing the first media content, wherein the analyzing comprises:

comparing the first media content to the selective media content type, and in response to the first media content matching the selective media content type, determining a context of the first media content and a mood of the first user based on the first media content;

determining a location, in a real-world environment, of a communication device associated with the first user;

determining an activity of the first user based on the context of the first media content and the location of the first user;

generating second data associated with an adjusted avatar based on the activity, and the mood of the first user, wherein the adjusted avatar includes a change in the avatar reflecting the activity of the first user and the mood of the first user;

configuring the adjusted avatar to be an active avatar associated with the first user;

providing the second data to the first social media server, wherein the first social media server ceases presenting the avatar on the first social media site and presents the adjusted avatar on the first social media site according to the second data;

receiving a request from a second social media server for the active avatar associated with the first user, wherein the request is provided by the second social media server in response to determining that the active avatar associated with the first user is to be presented to a second user;

determining that the active avatar is currently configured as the adjusted avatar resulting in a first determination; and based on the first determination, providing the second data to the second social media server, wherein the second social media server presents the adjusted avatar to the second user on a second social media site according to the second data, and wherein the adjusted avatar includes the change in the avatar reflecting the activity of the first user and the mood of the first user.

2. The device of claim 1, wherein the device comprises a server located in a core network of a communication network that communicates with the first social media server and the second social media server.

3. The device of claim 1, wherein the second social media server is associated with a second social media site, and wherein the operations comprise:

in response to receiving the request from the second social media server, determining that the active avatar is not appropriate for the second social media site resulting in a second determination;

based on the second determination, providing a notification to the first user, via the communication device, indicating that the active avatar is not appropriate for the second social media site and indicating a group of avatars to select instead of the active avatar;

receiving user-generated input from the communication device, wherein the user-generated input indicates a selected avatar from the group of avatars; and configuring the adjusted avatar to be the selected avatar associated with the first user.

4. The device of claim 1, wherein the first social media server determines that the avatar is being presented on a second communication device associated with a second user utilizing a first social media application associated with the first social media server and the first social media site.

5. The device of claim 4, wherein the first social media server provides the second data to the second communication device associated with the second user, and wherein the second communication device replaces the avatar with the adjusted avatar according to the second data utilizing the first social media application.

6. The device of claim 1, wherein the first media content is selected from a group of textual content, audio content, image content, and video content.

7. The device of claim 6, wherein the analyzing of the first media content comprises analyzing the textual content utilizing textual content recognition techniques.

8. The device of claim 6, wherein the analyzing of the first media content comprises analyzing the audio content utilizing voice recognition techniques.

9. The device of claim 6, wherein the analyzing of the first media content comprises analyzing the one of the image content and video content utilizing image recognition techniques.

10. The device of claim 1, wherein the first social media server has previously presented each of a group of media content associated with the first user with the avatar on the first social media site, and wherein the first social media server replaces the avatar associated with each of the group of media content with the adjusted avatar according to the second data.

11. The device of claim 1, wherein the second social media server ceases presenting the avatar on a second social media site with second media content associated with the first user.

12. The device of claim 1, wherein the first social media site is selected from the group consisting of a social media website, a social media mobile site, a social media virtual reality site, and a gaming site.

13. A non-transitory, machine-readable medium, comprising executable instructions that, when executed by a processing system including a processor, facilitate performance of operations, the operations comprising:

receiving management data associated with an avatar of a first user, the management data comprising user input that specifies a selective media content type, posted on social media, which is allowed to be used to adjust the avatar;

identifying first media content associated with social media activity of the first user provided to a first social media server, wherein the first social media server presents the first media content and the avatar on a first social media site;

analyzing the first media content, wherein the analyzing comprises:

comparing the first media content to the selective media content type, and in response to the first media content matching the selective media content type, determining a context of the first media content and a mood of the first user based on the first media content;

determining a location, in a real-world environment, of a communication device associated with the first user;

determining an activity of the first user based on the context of the first media content and the location of the first user;

generating second data associated with an adjusted avatar based on the activity and the mood of the first user, wherein the adjusted avatar includes a change in the avatar reflecting the activity of the first user and the mood of the first user;

configuring the adjusted avatar to be an active avatar associated with the first user;

receiving a request from a second social media server for the active avatar associated with the first user, wherein the request is provided by the second social media server in response to determining that the active avatar associated with the first user is to be presented to a second user;

determining that the active avatar is currently configured as the adjusted avatar resulting in a determination; and based on the determination, providing the second data to the second social media server, wherein the second social media server previously presented second media content associated with the first user with the avatar on a second social media site, wherein the second social media server replaces the avatar with the adjusted avatar according to the second data, and wherein the adjusted avatar includes the change in the avatar reflecting the activity of the first user and the mood of the first user.

14. The non-transitory, machine-readable medium of claim 13, wherein the executable instructions are configured to operate on a server located in a core network of a communication network that communicates with the first social media server and the second social media server.

15. The non-transitory, machine-readable medium of claim 13, wherein the second social media server is associated with a second social media site, and wherein the operations comprise:

in response to receiving the request from the second social media server, determining that the active avatar is not appropriate for the second social media site resulting in a second determination;

based on the second determination, providing a notification to the first user, via the communication device, indicating that the active avatar is not appropriate for the second social media site and indicating a group of avatars to select instead of the active avatar;

receiving user-generated input from the communication device, wherein the user-generated input indicates a selected avatar from the group of avatars; and configuring the adjusted avatar to be the selected avatar associated with the first user.

16. The non-transitory, machine-readable medium of claim 13, wherein the operations comprise providing the second data to the first social media server, and wherein the first social media server ceases presenting the avatar on the first social media site and presents the adjusted avatar on the first social media site according to the second data.

17. The non-transitory, machine-readable medium of claim 13, wherein the first social media server determines that the avatar is being presented on a second communication device associated with a second user utilizing a first social media application associated with the first social media server and the first social media site.

18. The non-transitory, machine-readable medium of claim 17, wherein the first social media server provides the second data to the second communication device associated with the second user, and wherein the second communication device replaces the avatar with the adjusted avatar according to the second data utilizing the first social media application.

19. The non-transitory, machine-readable medium of claim 13, wherein the first social media site is selected from the group consisting of a social media website, a social media mobile site, a social media virtual reality site, and a gaming site.

20. A method, comprising:

receiving, by a processing system including a processor, management data associated with an avatar of a first user, the management data comprising user input that specifies a selective media content type, posted on social media, which is allowed to be used to adjust the avatar;

identifying, by the processing system, first media content associated with social media activity of the first user provided to a first social media server, wherein the first social media server presents the first media content and the avatar on a first social media site;

analyzing, by the processing system, the first media content, wherein the analyzing comprises:

comparing the first media content to the selective media content type, and in response to the first media content matching the selective media content type, determining a context of the first media content and a mood of the first user based on the first media content;

determining, by the processing system, a location, in a real-world environment, of a communication device associated with the first user;

determining an activity of the first user based on the context of the first media content and the location of the first user;

generating, by the processing system, second data associated with an adjusted avatar based on the activity, and the mood of the first user, wherein the adjusted avatar includes a change in the avatar reflecting the activity of the first user and the mood of the first user;

configuring, by the processing system, the adjusted avatar to be an active avatar associated with the first user;

receiving, by the processing system, a request from the first social media server for the active avatar associated with the first user, wherein the request is provided by the first social media server in response to determining, by the processing system, that the active avatar associated with the first user is to be presented to a second user;

determining, by the processing system, that the active avatar is currently configured as the adjusted avatar resulting in a determination; and based on the determination, providing, by the processing system, the second data to the first social media server, wherein the first social media server determines that the avatar is being presented on a second communication device associated with the second user utilizing a first social media application associated with the first social media server and the first social media site, wherein the first social media server provides the second data to the second communication device associated with the second user, wherein the second communication device replaces the avatar with the adjusted avatar according to the second data utilizing the first social media application, and wherein the adjusted avatar includes the change in the avatar reflecting the activity of the first user and the mood of the first user.

* * * * *